(12) United States Patent
Formanski et al.

(10) Patent No.: US 8,410,760 B2
(45) Date of Patent: Apr. 2, 2013

(54) BATTERY THERMAL SYSTEM CONTROL STRATEGY

(75) Inventors: Volker Formanski, Wiesbaden (DE); Marc Reischmann, Wallertheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 332 days.

(21) Appl. No.: 12/848,726

(22) Filed: Aug. 2, 2010

(65) Prior Publication Data

US 2012/0029724 A1  Feb. 2, 2012

(51) Int. Cl.
*H02J 7/04* (2006.01)
*H01M 10/50* (2006.01)
*G01K 1/14* (2006.01)

(52) U.S. Cl. ........ 320/150; 320/154; 320/160; 320/104; 429/62; 429/61; 374/141

(58) Field of Classification Search ................... 320/150
See application file for complete search history.

(56) References Cited

U.S. PATENT DOCUMENTS

| | | | |
|---|---|---|---|
| 6,225,780 B1 * | 5/2001 | Koch | 320/118 |
| 6,902,319 B2 * | 6/2005 | Wu et al. | 374/141 |
| 7,830,126 B2 * | 11/2010 | Kawahara et al. | 320/160 |
| 2002/0149357 A1 * | 10/2002 | Morimoto et al. | 324/150 |
| 2006/0068272 A1 * | 3/2006 | Takami et al. | 429/62 |
| 2007/0145954 A1 * | 6/2007 | Kawahara et al. | 320/150 |
| 2007/0212598 A1 * | 9/2007 | Iida et al. | 429/62 |
| 2009/0174369 A1 * | 7/2009 | Kawahara et al. | 320/150 |
| 2009/0206798 A1 * | 8/2009 | Choi et al. | 320/150 |

\* cited by examiner

*Primary Examiner* — Yalkew Fantu
(74) *Attorney, Agent, or Firm* — John A. Miller; Miller IP Group, PLC

(57) ABSTRACT

A method and system for controlling temperature in an electric vehicle battery pack which preserves battery pack performance and longevity while maximizing vehicle driving range. A controller prescribes a minimum allowable operating temperature in the battery pack, where the minimum operating temperature increases as battery pack state of charge and remaining useful life decrease. During vehicle driving operations, the minimum allowable temperature is computed, and a thermal management system is used to warm the battery pack only if necessary to raise its temperature above the calculated minimum level. By minimizing use of the thermal management system to warm the battery pack, energy consumption is reduced and vehicle driving range is increased, while not adversely affecting battery pack performance or durability. The same strategy is employed during charging, which reduces the amount of energy consumed from the grid for warming the battery pack.

19 Claims, 3 Drawing Sheets

BATTERY THERMAL SYSTEM CONTROL STRATEGY

BACKGROUND OF THE INVENTION

1. Field of the Invention

This invention relates generally to electric vehicle battery pack thermal management and, more particularly, to a method and system for managing the temperature in an electric vehicle battery pack which allows a battery pack at a high state of charge and/or high remaining useful life to be operated at a lower temperature than a battery pack at a lower state of charge and/or lower remaining useful life, thus reducing energy expenditure on battery pack heating and maximizing vehicle driving range, while still optimizing battery pack performance and durability.

2. Discussion of the Related Art

Electric vehicles are rapidly gaining popularity in today's automotive marketplace. Electric vehicles offer several desirable features, such as eliminating local emissions and usage of petroleum-based fuels at the consumer level, and potentially lower operating costs. A key component of electric vehicles is the battery pack, which can represent a substantial proportion of the vehicle's cost. Battery packs in these vehicles typically consist of numerous interconnected cells, which are able to deliver a lot of power on demand. Maximizing battery pack performance and life are key considerations in the design and operation of electric vehicles.

In order to maximize battery pack performance and durability, the temperature in the battery pack must be maintained at a certain minimum level when the battery pack is discharging during vehicle operation. Control systems in existing electric vehicles typically prescribe a constant minimum temperature in the battery pack, irrespective of state of charge or remaining useful life of the battery pack, and use an onboard thermal management system to ensure battery pack temperature is at or above the minimum set point level during vehicle operation. However, using the thermal management system to warm the battery pack before or during driving operation consumes energy, which detracts from the driving range of the vehicle. It has now been observed that the performance of lithium-ion battery packs can still be sufficient to meet vehicle requirements if the minimum set point temperature in the battery pack is lowered for battery packs with a high state of charge and/or remaining useful life. In addition, lowering the temperature set point is beneficial for battery durability.

There is an opportunity to employ a battery pack thermal management methodology which determines minimum set point temperature as a function of state of charge and remaining useful life, thus ensuring optimum battery pack performance and life, but also maximizing vehicle range by not expending energy to warm the battery pack unnecessarily. Such a method could increase customer satisfaction through improved vehicle driving range and decreased power consumption from the grid.

SUMMARY OF THE INVENTION

In accordance with the teachings of the present invention, a method and system are disclosed for controlling temperature in an electric vehicle battery pack such that battery pack performance and longevity are preserved, while vehicle driving range is maximized. A controller prescribes a minimum allowable temperature in the battery pack as a function of state of charge and remaining useful life of the battery pack. This control strategy reflects evidence that lithium-ion battery packs can be operated at lower temperatures when battery pack state of charge and/or remaining useful life are high, without having a detrimental effect on battery pack performance or durability. During vehicle driving operations, the minimum allowable temperature is computed, and a thermal management system is used to warm the battery pack only if necessary to raise its temperature above the calculated minimum level. By minimizing use of the thermal management system to warm the battery pack, energy consumption is reduced and vehicle driving range is increased. The same thermal management strategy is employed during charging, which can reduce the amount of energy consumed from the grid by not unnecessarily warming the battery pack.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a battery thermal system control strategy is merely exemplary in nature, and is in no way intended to limit the invention or its applications or uses. For example, the present invention has particular application to electric vehicle battery packs, but may be equally applicable to battery packs in gasoline/electric or fuel cell/electric hybrid vehicles, battery packs in utility vehicles, such as forklifts, and non-vehicle-based battery packs.

Battery pack performance and durability, and vehicle driving range, are key considerations in the design of an electric vehicle. It is well known in the industry that a lithium ion battery pack's performance can suffer if the battery pack is operated at too low of a temperature. Therefore, electric vehicles typically include an onboard thermal management system to maintain battery pack temperatures above a certain level, which is known to be conducive to optimum performance and battery pack life. Thermal management systems in existing electric vehicles typically prescribe a single minimum allowable temperature in the battery pack, and the thermal management system is engaged as necessary to maintain battery pack temperature at or above this fixed limit. However, operating the battery pack thermal management system consumes energy, which detracts from the driving range of the vehicle. A new thermal management strategy is proposed, in which lower battery pack temperatures are allowed under many conditions, thus reducing the amount of heating energy consumed by the thermal management system.

In addition to the minimum battery pack temperature considerations described above, electric vehicle battery packs must also be controlled to prevent the temperature from becoming too high. While a battery pack cooling strategy is not the subject of the present invention, the battery pack thermal management strategy disclosed herein has a favorable impact on the cooling strategy, as will be discussed below.

Recent testing has revealed that the performance of lithium-ion battery packs is a function of not only temperature but also the state of charge and the age of the battery pack. That is, a battery pack in a high state of charge can be operated at a lower temperature than a battery pack in a lower state of charge, and a new battery pack can be operated at a lower temperature than an old battery pack. The present invention exploits this phenomenon with a thermal management system designed to preserve battery pack performance and longevity, but also maximize electric vehicle driving range. This is done by judiciously using the thermal management system and allowing the battery pack to be operated at a somewhat lower temperature than would have been allowed previously, if the battery pack is in a high state of charge and/or has most of its useful life remaining.

Figure 1:
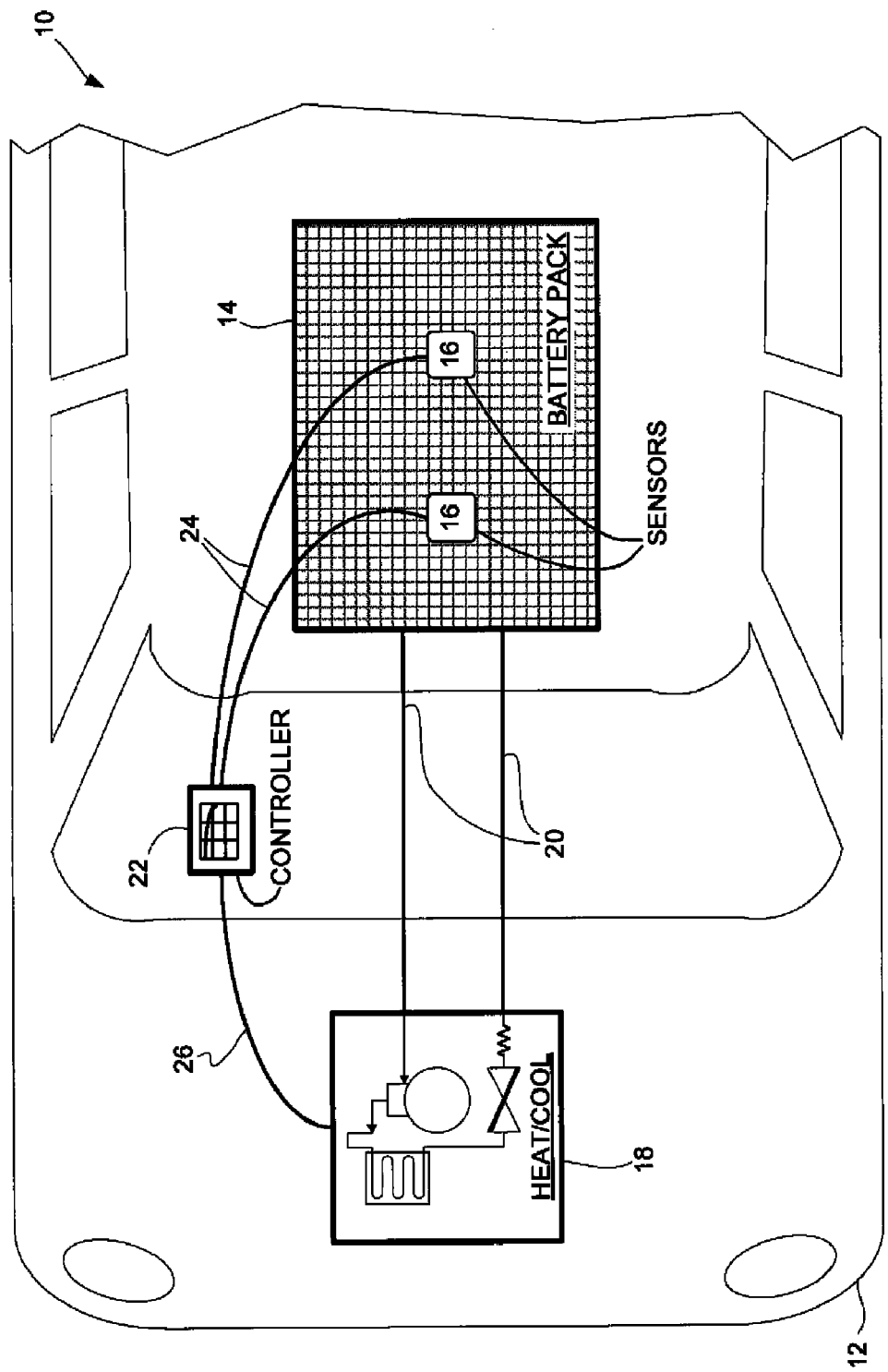
FIG. 1 is a schematic diagram of an electric vehicle battery pack thermal management system.

FIG. 1 is a schematic diagram of an electric vehicle battery pack thermal management system 10. A vehicle 12 uses electric motors (not shown) for propulsion, with electrical energy for the motors provided by a battery pack 14. The battery pack 14 is fitted with a plurality of sensors 16, including devices which monitor temperature and state of charge in the battery pack 14. The sensors 16 can also monitor various battery pack properties that are used to compute the age of the battery pack 14, or alternatively, its remaining useful life. Other parameters may also be monitored by the sensors 16, and temperature and state of charge may be measured at multiple locations throughout the battery pack 14 by the sensors 16. A heating and cooling system 18 is used to warm or cool the battery pack 14 as necessary to maintain the temperature in the battery pack 14 within a prescribed range, as will be discussed below.

The heating and cooling system 18 is connected to the battery pack 14 by fluid lines 20, which deliver a chilled or warmed fluid to the battery pack 14 and return the fluid to the heating and cooling system 18. The fluid in the fluid lines 20 may be a liquid, such as a refrigerant; air or another gas; or a two-phase mixture of a liquid and a gas. The heating and cooling system 18 may be of any type suitable for the purpose described herein, including a traditional refrigerant-based cooling system with a supplemental heater, a two-stage system which delivers a secondary fluid through the fluid lines 20, a thermal storage system which stores heat from the battery pack 14 in a fluid and either dissipates the heat to the environment through a radiator or uses the heat to subsequently warm the battery pack 14 or the interior of the vehicle 12, and other types.

A controller 22 is used to control the heating and cooling system 18, based on conditions in the battery pack 14 as monitored by the sensors 16. The controller 22 is in communication with the sensors 16 via connections 24, and with the heating and cooling system 18 via a connection 26. The connections 24 and 26 may be wired or wireless. The controller 22 is configured to engage the heating and cooling system 18 as necessary to warm or cool the battery pack 14 in order to maintain temperature in the battery pack 14 within a prescribed range, where the prescribed temperature range is dependent on the state of charge and the remaining useful life of the battery pack 14. In the remainder of the discussion below, only the portion of the thermal management strategy which deals with warming the battery pack to the prescribed minimum set point temperature, which is the subject of the present invention, will be addressed.

Figure 2:
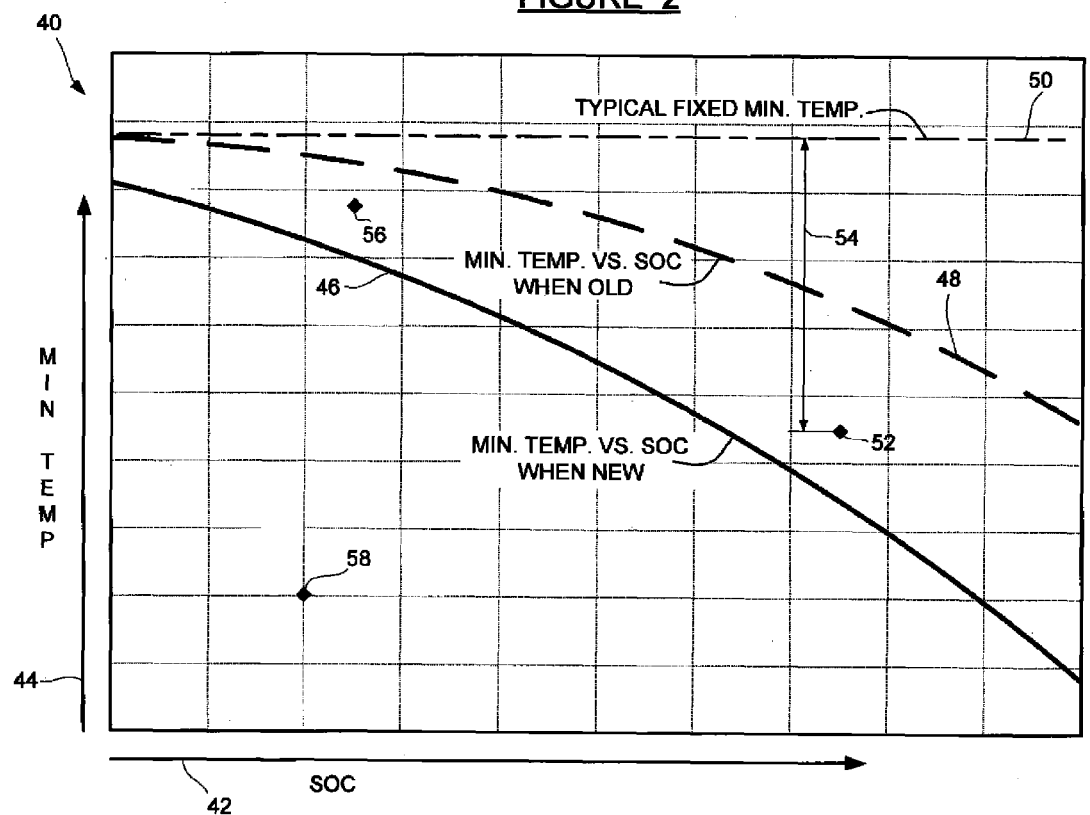
FIG. 2 is a graph of minimum allowable temperature in the battery pack as a function of state of charge and remaining useful life, according to the present invention.

FIG. 2 is a graph 40 showing minimum allowable temperature, also known as minimum set point temperature, in the battery pack 14 as a function of state of charge and remaining useful life of the battery pack 14. The graph 40 plots state of charge percentage in the battery pack 14 on horizontal axis 42, and minimum allowable temperature in the battery pack 14 on vertical axis 44. Curve 46 represents the minimum temperature at which the battery pack 14 may be operated, at any particular state of charge, if the battery pack 14 is at its beginning of life (BOL), or 100% remaining useful life. Curve 48 represents the minimum temperature at which the battery pack 14 may be operated, at any particular state of charge, if the battery pack 14 is at its end of life (EOL), or near 0% remaining useful life. The minimum allowable temperature shown by the curves 46 and 48 is determined by the required performance of discharge and charge power. Line 50 represents a constant or fixed minimum operating temperature which is typical of existing thermal management systems used in electric vehicles today.

Point 52 represents a set point temperature for an operating condition at which the battery pack 14 is at a state of charge of 75% and a remaining useful life of 65%. That is, the point 52 is 65% of the distance from the curve 48 to the curve 46. Distance 54 shows the difference in set point temperature between the strategy of the present invention, which takes into account the state of charge and remaining useful life of the battery pack 14, and a traditional thermal management strategy, which prescribes a fixed minimum operating temperature in the battery pack 14. The distance 54 is proportional to the amount of heating energy saved by the variable set point strategy, which translates directly into increased driving range for the electric vehicle 12. While units have been omitted from the graph 40, it is noted that when the battery pack 14 has a high state of charge and is near beginning of life, the difference between the disclosed variable set point temperature and the traditional fixed set point temperature can be 20 Celsius degrees or more.

Point 56 represents a set point temperature for an operating condition at which the battery pack 14 is at a state of charge of 25% and a remaining useful life of 50%. Even in this state of relative discharge and age, the battery pack 14 can be operated at a temperature lower than that prescribed by a traditional fixed set point strategy. Only when the battery pack 14 reaches a very low state of charge and is near the end of its useful life does the minimum allowable operating temperature approach the traditional fixed set point temperature, as indicated at the far left end of the curve 48.

In addition to the direct savings in heating energy described above, there is a secondary benefit to the strategy of operating the battery pack 14 at lower temperatures if battery pack conditions permit. The secondary benefit is that less energy may need to be expended on cooling the battery pack 14 later in an operational cycle. As is well known in the art, lithium ion battery packs generate heat when they are being discharged. Therefore, in a typical cool-weather scenario involving a traditional thermal management system with a fixed minimum temperature set point, the battery pack 14 would have to be heated up to the temperature represented by the line 50 on the graph 40 before vehicle operation could begin. Then, as the vehicle 12 is driven and the battery pack 14 discharges, the temperature in the battery pack 14 would rise, possibly to the point where the battery pack heating and cooling system 18 would have to be operated in cooling mode to prevent the battery pack 14 from getting too hot, to avoid impact on durability. The thermal management strategy of the present invention, by allowing driving operations to begin with the battery pack 14 at a much lower temperature when near full charge, greatly reduces the chance that the battery pack 14 will have to be cooled later in the same driving cycle. Also, using the thermal management strategy of the present invention, the overall temperature distribution is lower, which is beneficial for battery pack durability.

The shape of the curve 46 shown on the graph 40 was derived from extensive testing of lithium-ion battery packs. The testing measured battery pack performance as a function of temperature, state of charge, and life time degradation. While it is known in the art that the performance of lithium ion battery packs drops off significantly with decreasing temperature, the testing showed that the threshold temperature, below which the battery pack 14 no longer provides the required performance, is lower for a fully charged battery pack than for a nearly discharged battery pack, and that this threshold temperature is lower for a beginning of life battery pack than for a near end of life battery pack. In other words, a temperature which was low enough to cause significant performance degradation in a tested lithium-ion battery pack which was nearly discharged caused no significant performance degradation in the same test battery pack which was near full charge. Plotting the test data as the minimum allowable operating temperature at any given state of charge which maintains good battery pack performance, for a beginning of life battery pack, yields the curve 46. Similarly, plotting the test data as the minimum allowable operating temperature at any given state of charge which maintains good battery pack performance, for an end of life battery pack, yields the curve 48.

The variable set point temperature strategy can also save energy when recharging the battery pack 14. When the battery pack 14 needs to be recharged, it will often be in a condition of low state of charge. In low ambient temperature conditions, the battery pack 14 may also be at a relatively low temperature. This low state of charge, low temperature condition is represented by point 58 on the graph 40. Using a traditional thermal management strategy, the battery pack 14 might be recharged and warmed up to the temperature of the constant set point line 50. But under the strategy of the present invention, the battery pack 14 can be recharged to a full charge condition, without additional heating, by adaptation of the recharge power to the battery performance according to state of charge, degradation, and temperature. Battery pack recharging naturally generates some heat, so that the battery pack temperature, when fully recharged, would be within the allowable operating range. By not adding heat from the heating and cooling system 18 during recharging, the variable set point temperature strategy reduces the amount of energy consumed from the electrical grid.

A control strategy based on the graph 40 can be programmed into the controller 22 to increase the driving range of the vehicle 12, while ensuring good performance of the battery pack 14, per the process described below.

Figure 3:
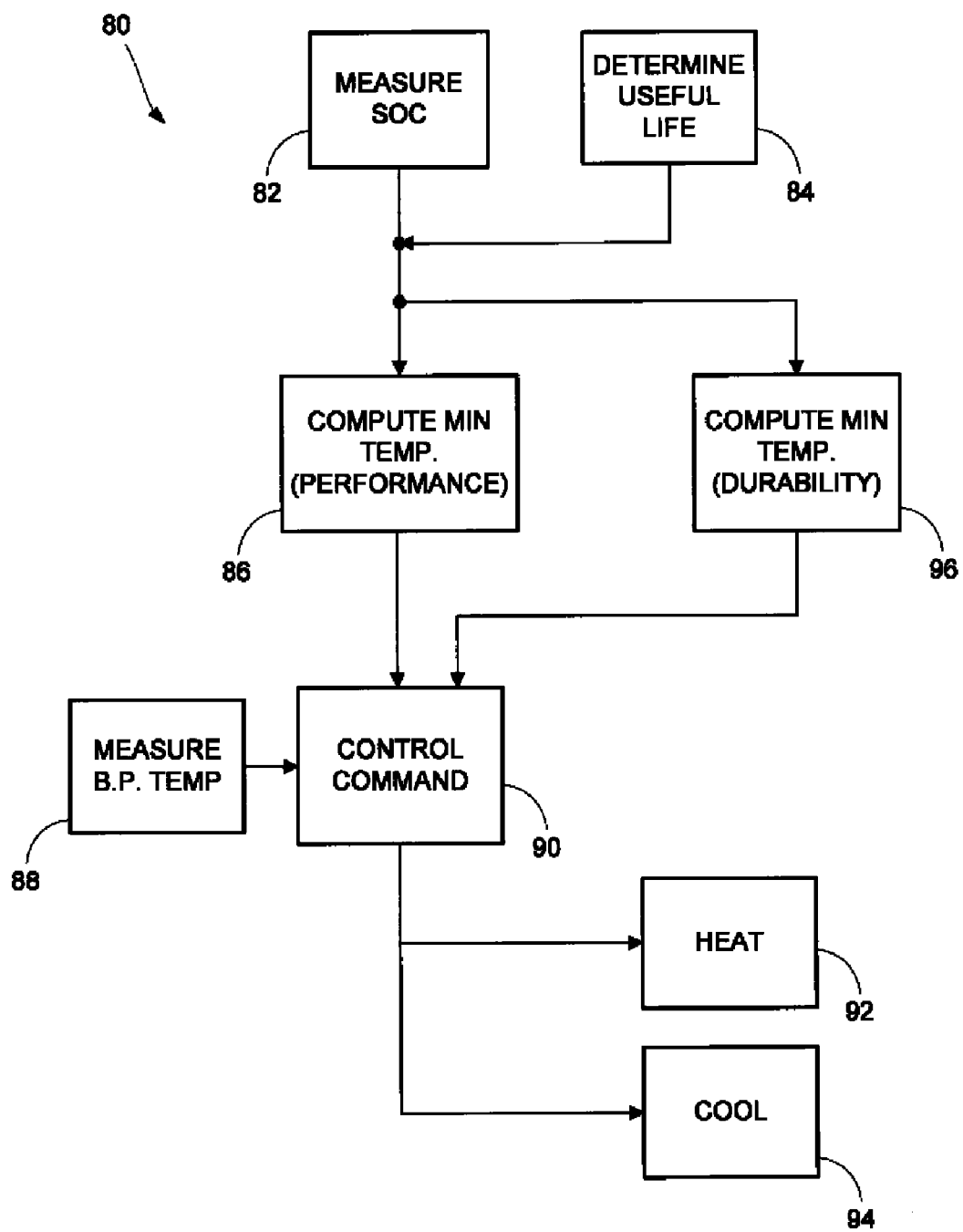
FIG. 3 is a process flow diagram of a method for managing the temperature in the battery pack as a function of state of charge and remaining useful life.

FIG. 3 is a flow chart diagram 80 of a process which can be used by the controller 22 to manage the operation of the heating and cooling system 18. At box 82, the state of charge of the battery pack 14 is measured by the sensors 16. At box 84, the remaining useful life of the battery pack 14 is determined, either from the sensors 16, or by way of a timetable built into the controller 22. At box 86, the controller 22 computes the minimum set point temperature at which the performance of the battery pack 14 will not drop off significantly, as a function of the state of charge from the box 82 and the remaining useful life from the box 84.

While the curves 46 and 48 are shown on the graph 40 as generic shapes with no values given for temperature or state of charge, in actual practice the curves 46 and 48 would be specifically defined so that a minimum set point temperature (in degrees Celsius, for example) could be looked up for any given state of charge from 0% through 100%. The performance-based set point temperature would then be determined at the box 86 by interpolating between the curves 46 and 48, based on the percentage of remaining useful life of the battery pack 14.

At box 88, the actual temperature in the battery pack 14 is measured by the sensors 16. Battery pack temperature is provided to box 90 where an overall battery pack temperature control is defined. The box 90 determines whether to command heat from the heating and cooling system 18 at box 92, or command cooling from the heating and cooling system 18 at box 94, or neither.

As discussed above, the performance of lithium ion battery packs varies as a function of state of charge, remaining useful life, and temperature. In addition to this performance consideration, the durability of lithium ion battery packs may also be affected by operating temperature. To this end, a minimum allowable operating temperature based on durability considerations may also be defined. This durability-based minimum set point temperature is calculated at box 96 of the flow chart diagram 80. The durability-based lower set point temperature is provided to the overall battery pack temperature control box 90, which determines whether to command heating at the box 92 or cooling at the box 94, or neither. The overall battery pack temperature control box 90 determines whether heating or cooling is needed based on both performance-based minimum temperature considerations and durability-based minimum temperature considerations, as well as maximum temperature limits which may need to be considered. Various rules can be defined for determining whether the performance-based set point temperature or the durability-based set point temperature takes precedence.

By using the control strategy described above, significant improvements in electric vehicle driving range can be realized, as energy is not used unnecessarily to add heat to the battery pack 14 before driving. Also, by using the variable set point temperature control strategy described above, the amount of energy consumed from the electrical grid is reduced, as the battery pack 14 is not unnecessarily heated during the charging process.

Along with electric vehicles, the thermal management strategy described above is also applicable to battery packs in hybrid gasoline/electric or fuel cell/electric vehicles, where the energy savings due to reduced battery pack heating result in improved fuel economy, which ultimately translates into increased driving range.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for thermal management of a battery pack, said method comprising:
    determining state of charge of the battery pack and designating the state of charge most recently determined as current state of charge;
    determining remaining useful life of the battery pack;
    defining a minimum set point temperature for operation of the battery pack, where the minimum set point temperature is based on required battery pack performance, the state of charge of the battery pack, and the remaining useful life of the battery pack;
    measuring temperature in the battery pack; and
    controlling the temperature in the battery pack to prevent the battery pack from being operated when the temperature is below the minimum set point temperature.

2. The method of claim 1 wherein defining a minimum set point temperature for operation of the battery pack includes increasing the minimum set point temperature as the state of charge of the battery pack decreases.

3. The method of claim 1 wherein defining a minimum set point temperature for operation of the battery pack includes increasing the minimum set point temperature as the remaining useful life of the battery pack decreases.

4. The method of claim 1 wherein controlling the temperature in the battery pack includes adding heat to the battery pack until the temperature in the battery pack is raised to the minimum set point temperature at the current state of charge and remaining useful life.

5. The method of claim 1 wherein controlling the temperature in the battery pack includes controlling the flow of a fluid through the battery pack to add heat to the battery pack.

6. The method of claim 1 wherein the battery pack is used in an electric vehicle.

7. The method of claim 1 wherein the battery pack is a lithium-ion battery pack.

8. A method for thermal management of a lithium-ion battery pack in an electric vehicle, said method comprising:
   determining state of charge of the battery pack and designating the state of charge most recently determined as current state of charge;
   determining remaining useful life of the battery pack;
   defining a first minimum set point temperature for operation of the battery pack, where the first minimum set point temperature is based on required battery pack performance, the state of charge of the battery pack, and the remaining useful life of the battery pack;
   defining a second minimum set point temperature for operation of the battery pack, where the second minimum set point temperature is based on required battery pack durability, the state of charge of the battery pack, and the remaining useful life of the battery pack;
   defining a maximum set point temperature for operation of the battery pack;
   measuring temperature in the battery pack; and
   controlling the temperature in the battery pack based on the first minimum set point temperature, the second minimum set point temperature, and the maximum set point temperature.

9. The method of claim 8 wherein defining a first minimum set point temperature for operation of the battery pack includes increasing the first minimum set point temperature as the state of charge of the battery pack decreases.

10. The method of claim 8 wherein defining a first minimum set point temperature for operation of the battery pack includes increasing the first minimum set point temperature as the remaining useful life of the battery pack decreases.

11. The method of claim 8 wherein controlling the temperature in the battery pack includes selecting either the first minimum set point temperature or the second minimum set point temperature, and adding heat to the battery pack until the temperature in the battery pack is raised to the selected set point temperature at the current state of charge and remaining useful life.

12. The method of claim 8 wherein controlling the temperature in the battery pack includes removing heat from the battery pack until the temperature in the battery pack is lowered to the maximum set point temperature.

13. The method of claim 8 wherein controlling the temperature in the battery pack includes controlling the flow of a fluid through the battery pack to add heat to or remove heat from the battery pack.

14. A thermal management system for a battery pack providing electrical energy to an apparatus, said thermal management system comprising:
   a plurality of sensors for measuring voltage in the battery pack and temperature in the battery pack, where the measured voltage is used to determine state of charge of the battery pack, and the state of charge last determined is designated as current state of charge;
   means for determining remaining useful life of the battery pack;
   a heating and cooling system for adding heat to or removing heat from the battery pack; and
   a controller for managing the temperature in the battery pack, said controller being responsive to measurement signals from the sensors and being configured to control the heating and cooling system to control the temperature in the battery pack as a function of the state of charge of the battery pack and the remaining useful life of the battery pack.

15. The thermal management system of claim 14 wherein the controller is configured to control the temperature in the battery pack by defining a first minimum set point temperature, and commanding the heating and cooling system to add heat to the battery pack until the temperature in the battery pack is raised to the first minimum set point temperature at the current state of charge and the remaining useful life.

16. The thermal management system of claim 15 wherein the controller increases the first minimum set point temperature as the state of charge of the battery pack decreases, and increases the first minimum set point temperature as the remaining useful life of the battery pack decreases.

17. The thermal management system of claim 15 wherein the controller also defines a second minimum set point temperature, where the first minimum set point temperature is based on performance considerations and the second minimum set point temperature is based on durability considerations of the battery pack, and wherein the controller includes rules to select either the first minimum set point temperature or the second minimum set point temperature.

18. The thermal management system of claim 14 wherein the controller is configured to control the temperature in the battery pack by defining a maximum set point temperature, and commanding the heating and cooling system to remove heat from the battery pack until the temperature in the battery pack is lowered to the maximum set point temperature.

19. The thermal management system of claim 14 wherein the battery pack is a lithium-ion battery pack and the apparatus is an electric vehicle.

* * * * *